United States Patent
Khan et al.

(10) Patent No.: US 10,574,552 B2
(45) Date of Patent: Feb. 25, 2020

(54) OPERATION OF DATA NETWORK

(71) Applicant: BRITISH TELECOMMUNICATIONS PUBLIC LIMITED COMPANY, London (GB)

(72) Inventors: Kashaf Khan, London (GB); Steve Gibbs, London (GB); Detlef Nauck, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 199 days.

(21) Appl. No.: 15/516,519

(22) PCT Filed: Sep. 14, 2015

(86) PCT No.: PCT/EP2015/070978
§ 371 (c)(1),
(2) Date: Apr. 3, 2017

(87) PCT Pub. No.: WO2016/050495
PCT Pub. Date: Apr. 7, 2016

(65) Prior Publication Data
US 2018/0227203 A1    Aug. 9, 2018

(30) Foreign Application Priority Data

Oct. 3, 2014    (EP) .................................. 14275210

(51) Int. Cl.
*H04L 12/26*    (2006.01)
*G06F 11/34*    (2006.01)
(Continued)

(52) U.S. Cl.
CPC .......... *H04L 43/0817* (2013.01); *G06F 9/455* (2013.01); *G06F 9/5022* (2013.01); *G06F 11/3006* (2013.01); *G06F 11/3433* (2013.01); *H04L 41/5096* (2013.01); *H04L 43/026* (2013.01); *H04L 43/0876* (2013.01);
(Continued)

(58) Field of Classification Search
CPC .................................................. H04L 43/0817
See application file for complete search history.

(56) References Cited

U.S. PATENT DOCUMENTS 8,028,337 B1 *   9/2011   Xu .......................... G06F 11/00
                                                                  726/23
2009/0241030 A1   9/2009   Von Eicken et al.
(Continued)

FOREIGN PATENT DOCUMENTS

EP         1 742 416 A1     1/2007

OTHER PUBLICATIONS

International Search Report for PCT/EP2015/070978, dated Dec. 1, 2015, 2 pages.
(Continued)

*Primary Examiner* — Suraj M Joshi
(74) *Attorney, Agent, or Firm* — Nixon & Vanderhye P.C.

(57) ABSTRACT

The servers in a data network are monitored (16) and classified (290) according to the data flows to and from the servers, to identify servers with low usage, and programming instructions and data relating to those servers are retrieved and stored (32, 17) so that they may subsequently be retrieved (18) to replicate the server to which they relate.

18 Claims, 2 Drawing Sheets

(51) Int. Cl.
*H04L 29/08* (2006.01)
*G06F 9/455* (2018.01)
*G06F 11/30* (2006.01)
*H04L 12/24* (2006.01)
*G06F 9/50* (2006.01)

(52) U.S. Cl.
CPC ...... *H04L 67/1031* (2013.01); *H04L 67/1095* (2013.01); *H04L 43/16* (2013.01)

(56) References Cited

U.S. PATENT DOCUMENTS

| | | | |
|---|---|---|---|
| 2010/0287390 A1* | 11/2010 | Yu | G06F 1/3209 713/310 |
| 2012/0227038 A1* | 9/2012 | Hunt | G06F 9/45558 718/1 |
| 2013/0227554 A1 | 8/2013 | Tsirkin et al. | |
| 2013/0297802 A1 | 11/2013 | Laribi et al. | |

OTHER PUBLICATIONS

Karagiannis, Thomas et al., "Profiling the End Host", PAM 2007, LNCS 4427, pp. 186-196, Springer-Verlag Berlin Heidelberg 2007 (11 pgs.).

Office Action dated Nov. 29, 2018 issued in European Application No. 15 762 641.7 (9 pgs.).

* cited by examiner

OPERATION OF DATA NETWORK

This application is the U.S. national phase of International Application No. PCT/EP2015/070978 filed 14 Sep. 2015, which designated the U.S. and claims priority to EP Patent Application No. 14275210.4 filed 3 Oct. 2014, the entire contents of each of which are hereby incorporated by reference.

BACKGROUND AND SUMMARY

This invention relates to the operation of a data network, and in particular to the efficient management of resources by monitoring for network elements that are not being used and shutting them down. This allows the resources that would be required to maintain those elements in operational condition, and to monitor their correct operation, to be used more effectively elsewhere in the network.

In particular, the invention is concerned with monitoring the use of network servers which have been installed to support the operation of specific applications, for example in the information technology operation of a large business enterprise, or a service made available to the public over a public telecommunications network.

In many cases the application, and the supporting server, are initially set up to support a specific task. However, when that task is complete, and the personnel who installed the server have moved on to other tasks, the existence of the server may be overlooked or, if its existence is properly recorded, its purpose may not be well documented. There may be no-one charged with the responsibility of decommissioning it. Moreover, it cannot be assumed that the completion of the task for which the server was originally installed implies that the server is now redundant, as other applications may have subsequently been developed which also rely on it. Furthermore, some essential applications may only be used occasionally, for example applications relating annual or seasonal events (e.g annual pay reviews, crop harvesting etc, or handling of extreme weather conditions).

A server may be embodied in a dedicated item of hardware. In most cases the server functions will not take up the entire capacity of the installed hardware. For more efficient use of resources, it is common to install the necessary functions in general-purpose server hardware which can host a number of server functions. These are known as "virtual servers". They are accessed using different IP addresses on the hardware.

In order to save resources, it is desirable to close down a server if it is not being used. As a precaution sufficient data may be stored to reinstate the server should it be discovered subsequently that there is a requirement for the application it embodies, so that a duplicate of the original server can be created. This process of shutting down a server in such a way that it (or a duplicate) can be re-instated if required is referred to in this specification as "hibernation". Such a system is described in United States Patent Application US2012/227038

It is known to use simple policy trigger thresholds on a suitable metric to initiate shut down or hibernation of servers. However, most existing systems require significant manual configuration to determine suitable trigger points. This involves the application and infrastructure administrators identifying what behaviour is indicative of a server that is, or is not, still active in order to identify suitable threshold values. It also requires some knowledge of the functions and intended use of the servers in order to determine suitable trigger points.

Simple threshold values of the volume of bits carried is used in European Patent specification 1742416 and United States Application US2010/0287390 which monitors and manages application flows on a network with an objective of increasing end user quality of experience and reducing the need to purchase expensive additional WAN bandwidth. These metrics are an unreliable indicator of CPU utilisation, especially if use is intermittent. In particular, a relatively small volume of bits transmitted to and from the server may nevertheless require a considerable amount of CPU power—for example a complex CPU process may result from a simple binary input such as an alarm, or may result in a simple binary output (go/no go). The United States application referenced also allows network elements to be put into a "standby" mode, but operation of a server in such a standby mode does not release its resources for other uses as in a full "hibernation".

It is known, for example from Karagiannis et al ("Profiling the End Host",—Proceedings of the Passive & Active Measurement Conference, 2007, page 186) to monitor the data flow to and from end users (clients) of a system, for example to determine whether service quality parameters are being met. However, such data is not useful for determining whether a connection or terminal is in use. In particular, if a terminal is not in use, it will not appear in the data, so it could not be used as the input source for decommissioning analysis.

According to the invention, there is provided a method of operating a data network comprising a plurality of servers, the servers having respective network addresses associated with respective application functions, comprising the steps of: monitoring data flows to and from the servers,
   classifying servers according to their data flow patterns;
   identifying servers classified as having data flow patterns indicative of low usage;
   retrieving programming instructions and data relating to the identified servers classified as having data flow patterns indicative of low usage;
   shutting down the servers classified as having data flow patterns indicative of low usage;
   storing the retrieved programme instructions and data in a storage medium from which the stored data relating to each server may subsequently be retrieved to create a corresponding virtual server replicating the server to which it relates by recovering and installing the stored programme instructions and data such that further data requests can be fulfilled by the virtual server The invention also extends to an apparatus for controlling the operation of a plurality of data servers connected to a data network, the servers having respective network addresses associated with respective application functions, the apparatus comprising:
   a data flow monitor to monitor data traffic to and from the servers,
   a server classification system for identifying servers having a data flow pattern associated with low usage of the servers;
   a server management system for accessing programming instructions and data from servers identified as having low-usage flow patterns, and shutting down the operation of such data servers
   a server hibernation store comprising data storage for the programming instructions and data accessed from the low-usage servers
   a server virtualisation system comprising a programmable server having means for retrieving, from the server hibernation store, programming instructions and data relating to a server and installing the programming instructions and data in a programmable server in order to generate a virtual server replicating the server in respect of which they were originally retrieved.

It will be appreciated that the mere volume of data handled by an application may not be indicative of the use or utility of the application itself. For example, an application may be gathering and storing a large volume of data, but this may be of no purpose if the need for that data has passed and no-one is accessing the results. Conversely, some data input and or extraction patterns may be highly seasonal, so that instantaneous usage volumes may be unrepresentative. The identification of data flow patterns indicative of low use of an application may be related to the flow patterns expected by the designers of the applications, but in the preferred embodiment each server is classified by comparison with the classification of exemplars from a model database of server data flow patterns. After classification the server characteristics may be added to the exemplars in the model database After its retrieved programme instructions and data have been stored, a server can be shut down, subject to a criticality override factor. A virtual server is created replicating the server that has been shut down by recovering and installing the stored programme instructions and data such that further data requests can be fulfilled by the virtual server. Data flows to the virtual server can be monitored and classified in the same way, and the virtual server shut down if it is classified as having data flow patterns indicative of low usage. The criteria for triggering a shut down of the virtual server may be different from the criteria applied to the original server from which the data was replicated.

The invention may be embodied as a computer program or suite of computer programs stored on a non-transitory computer-readable storage medium which upon execution by a computer system performs the invention.

The process uses network flow patterns to identify servers that are not being used, to allow such servers to be put into a dormant state (referred to herein as "hibernation") in which the resources they use can be released so as to reduce operational data centre costs and allow reuse of server hardware.

The servers to be monitored may be embodied in physical hardware, or may be "virtualised" servers, running software on a general-purpose computer that emulates a physical server. The network flows to and from these types of server are similar, and it is only necessary for the process to identify the relevant IP address, and not the nature of the associated hardware.

The term "hibernation" is used to refer to a process in which the resources required to operate the server can be restored if a requirement for it is subsequently identified, for example by the application owner attempting to access it. Once the application is hibernated, the application's operating parameters are backed up to long-term storage, so that if they are required in the future they can be provisioned in the virtualised datacentre. The user can restore the application data to a virtual data centre using a web-based self-service catalogue.

The process may identify some servers as being appropriate for immediate decommissioning rather than hibernation, or servers that have already been hibernated may be after a predetermined period of non-use, in either case this may be subject to a human intervention.

BRIEF DESCRIPTION OF THE DRAWINGS

An embodiment of the invention will be described by way of example and with reference to the figures, in which.

DETAILED DESCRIPTION OF PRESENT EXAMPLE EMBODIMENTS

Figure 1:
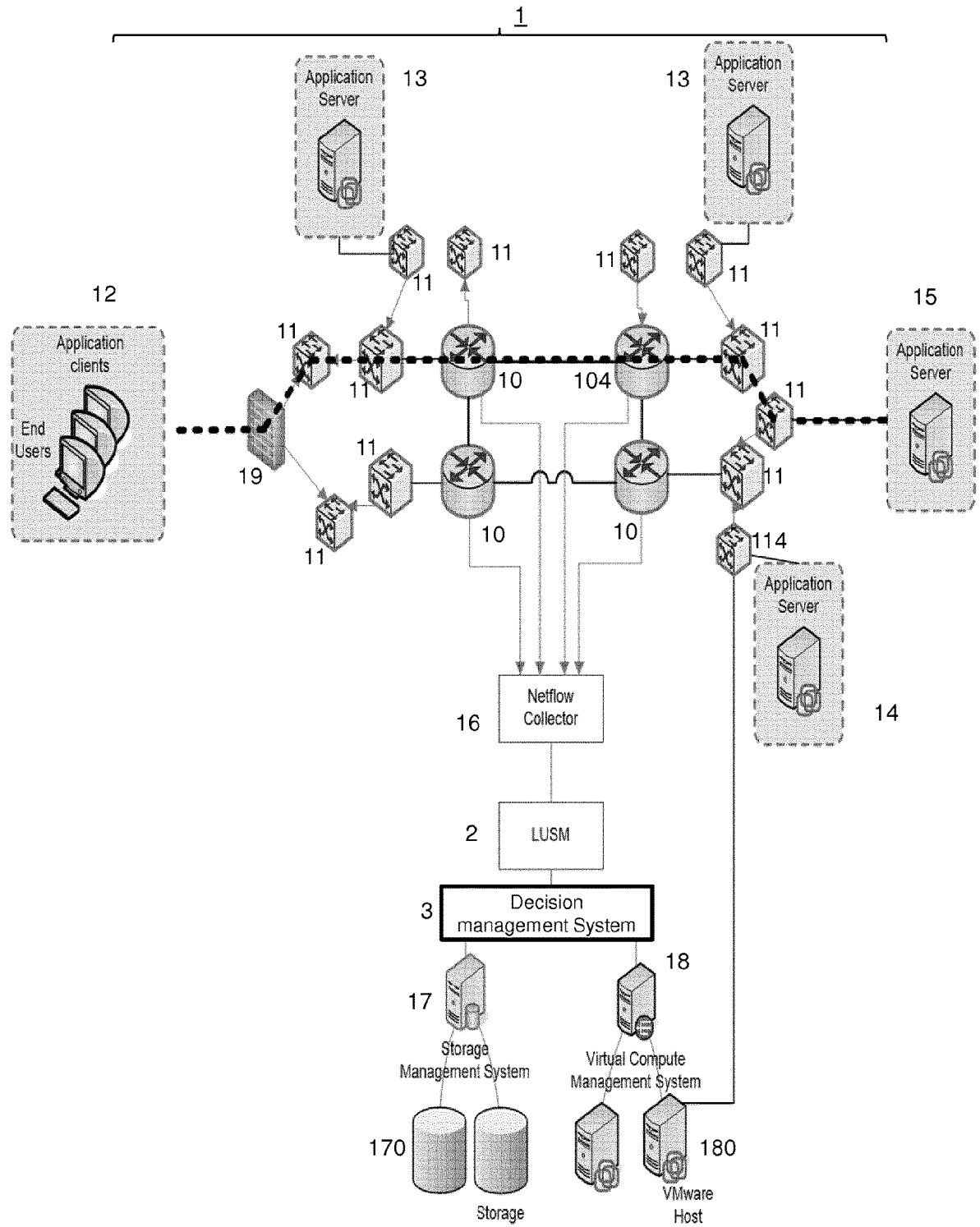
FIG. 1 depicts a network incorporating a server manager operating according to the invention

As depicted in FIG. 1, a core data network 1 comprises a number of routers 10 and switches 11 allowing end users (e.g 12) to access application servers (e.g 13, 14, 15, 180), through a firewall 19. A monitoring system 16 is used to capture data flows across the core network 1. The term "flow" refers to communication between an application server 13, 14, 15, 180 and an application client located at the user end 12. A typical flow, in this case between the client 12 and a server 15, is shown in black dots in FIG. 1. Typically there would be many more clients and servers in a core network than are depicted in this illustrative embodiment.

The server manager 2 operating according to the invention (depicted in more detail in FIG. 2) analyses each individual flow detected by the monitor 16. Using this data it identifies individual servers 13, 14, 15 and builds multi-dimensional profiles about the network behaviour of each server. These profiles are used by a decision management system 3 to determine an appropriate action to apply for each server.

As will be described in more detail with reference to FIG. 2, the decision management system 3 can generate instructions to hibernate or decommission a server. For hibernation it clones the server and copies the data to a storage management system 17 and a virtualized datacentre management system 18.

This allows the original server hardware (e.g 15) to be removed from the existing computing and storage resource.

A hibernating server can subsequently be reprovisioned on a virtualising server 180 using the virtual computer management system 18 and data retrieved from the storage system 170.

A server can subsequently be decommissioned by shutting down the virtual machine from the virtual computer management system 18, and deleting the related data from the store 170.

To avoid the user repeatedly having to restore an application that has been hibernated, the criteria for initiating hibernation for applications stored in the virtual host 180 are preferably set higher than they are for other servers 13, 14, 15.

Figure 2:
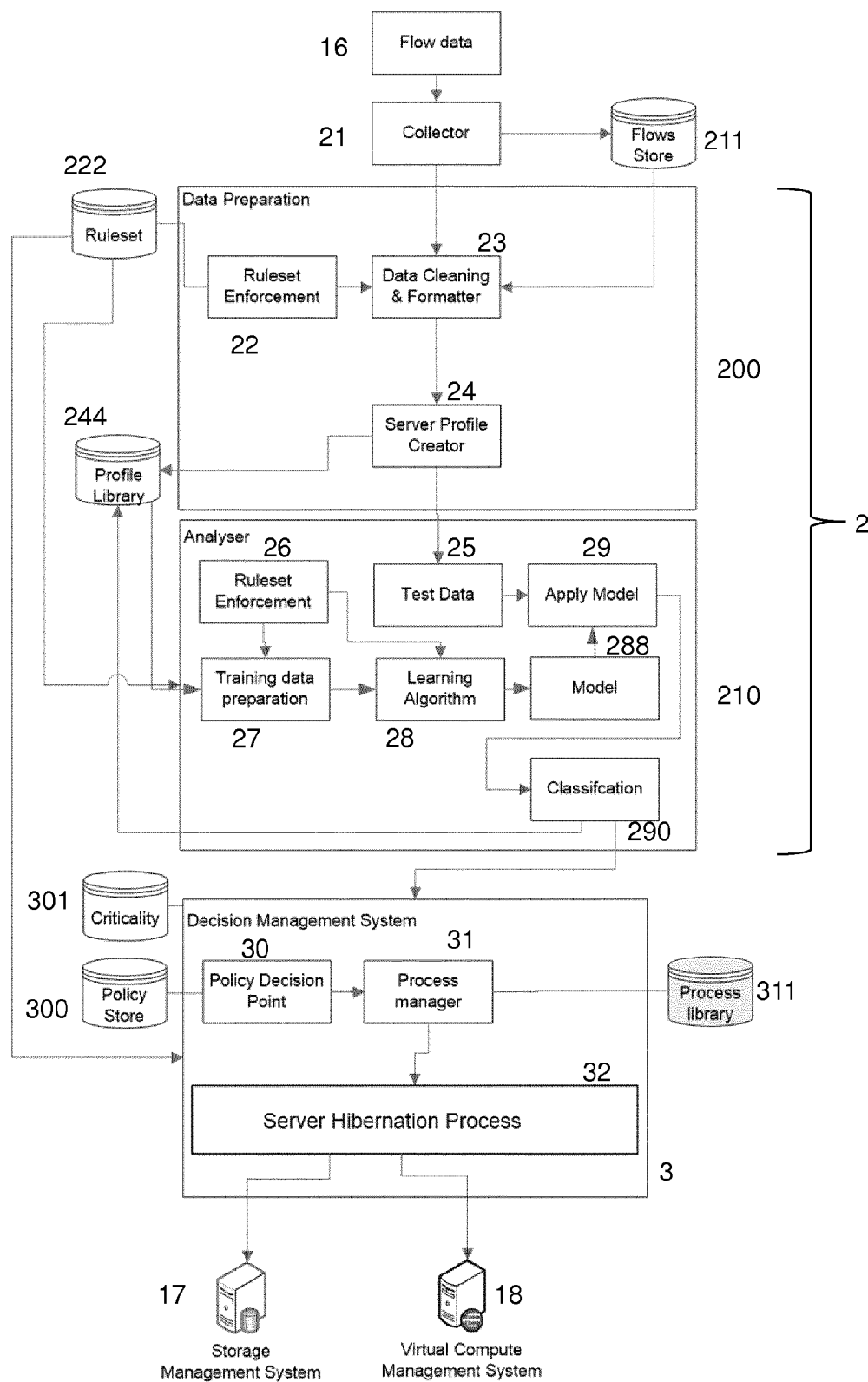
FIG. 2 is a diagram depicting an analysis processor operating according to the invention, and a decision management system associated with the analysis processor.

FIG. 2 provides an overview of the various functional elements of the server manager 2. In this process, a data collection function 21 receives the flow data from the monitoring system 16. Data can be received via an integration adapter that can run a scheduled file or database from a network monitoring system. The collector 21 checks that the data is in a recognisable format, and also checks for errors. It then adds the Capture time to the data and stores the flow data in a store 211, and notifies a Data Preparation processor 200 that a new event has occurred.

The Data preparation processor 200 comprises several steps 22, 23, 24, which clean and format the data then create server profiles required for Analysis by an analyser subsystem 210.

A Rule Enforcement step 22 retrieves rules from a store of rules 222 to configure the Data preparation processor 200, and records the number of times each rule is used. The rules determine how the data should be prepared. For each rule, the volume of events that trigger it is recorded. This is used by a Policy Decision function 30, which will be discussed later.

A data cleaning & formatting function 23 verifies that the data attributes collected by the collector 21 are in valid acceptable ranges, by reading the header of each data item, checking that the attribute name is recognised, and checking the range of the values in each flow for IP range, Port range, Bandwidth range and per-flow volume range.

After removing null values, the data cleaning and formatting function 23 then translates the format of the data from each flow into a common format to be used by the subsequent components. It then applies the rules retrieved by the rules enforcement function 22, using data input constraints that operate as a filter for incoming data.

The next stage is to create a profile for the server (step 24). This is done by defining a multi-dimensional vector that represents the network traffic behaviour of the server over a specified period of time, by identifying all flows relating to the server either as a server or as a client, identifies all the ports used, and counts the number of times each port is used. The data are then stored in a profile library 244.

The Analysis process 210 can then be used to determine whether a server whose data is stored in the profile library 244 is to be categorised as a low-use server. This process can be run periodically, or in response to a command from a user. The analysis process 210 operates a learning algorithm 28, which uses known training data 27 to develop a model 288 which is then used to classify test data 25 received from the data collection function 21 through the data preparation process.

In operation, the test data 25 is classified according to rules generated by a model 288 (step 29) to generate a classification 290. In this model an N-dimensional pattern space is created, with each port representing a dimension and the usage of that port representing the scalar value of that dimension. The generation of this model 288 will be discussed later. Any triggering of these rules, indicative of a potential low-use server, is communicated to the Policy Decision Point 30 to check if any constraints have been breached.

In the preferred embodiment the analysis step 29 uses an algorithm known as the "K-Nearest Neighbour" (KNN) algorithm. This searches all the examples in the model to find those with the smallest distance (in N-dimensional Euclidean space) between themselves and the new server which is to be classified. In the embodiment the three nearest examples are used (k=3) but this can be changed if defined in the analysis constraints. The closest three examples (or "k" examples) in the entire example space are selected. The classification of the respective three server profiles from the training set 244 are then used to identify the appropriate classification for the server under investigation. The number of the selected servers corresponding to low use profiles and the number corresponding to normal use profiles are determined, and a classification for the server under investigation derived therefrom. In the preferred embodiment, the server under investigation is given the same classification as the majority (two out of three) of those used for comparison, but if more caution is desirable a larger majority (e.g four out of five) may be required to classify a server as of "low use" and a candidate for hibernation.

The output of the modelling process 29 is sent to a classification processor 290, which creates a Server Profile object with the Classification, the server IP, and the server port vector. This is forwarded to the decision management system 3, and also used to update the profile library 244.

The model 288 used for classifying the server profiles (test data) 25 is generated using a learning algorithm 28 trained on a set of Server Profiles retrieved from the library 244 by a preparation step 27, to which a rule-setting function 26 is applied to define the characteristics which determine how the analysis components 28, 288 are to respond to the data in the profiles. The training set uses all the stored profile data so that the learning algorithm 28 improves with use. A single server profile is composed of all the ports used and the usage count of each port together with its classification of low or normal. All the servers profiles are used to create a Model object. The KNN algorithm 28 is then applied to the Model object along with the rule set 26 to generate the model 288.

On receiving a report from the classification processor 290 the Decision Management System 3 determines what action is required in respect of the server and executes a process workflow to implement the action. The actions may be decommissioning, or hibernation, or no action may be required.

A policy decision point 30 determines which workflow to execute based on the server profile. Policies are composed of triggers and actions, and provide rules which determine what to do with a particular server.

Having received a server classification from the classification server 290 in respect of a particular server, the decision point 30 retrieves from a store 300 a set of instructions corresponding to that classification and server (identified by its port number—that is to say its IP address). The decision point also refers to a store 301 recording business-critical or application-critical server addresses and ports, which can be used to override the general policy 300 and apply different actions, for example if an application is flagged as of high criticality the policy decision point 30 will not instruct decommissioning or hibernation, notwithstanding that its low utilisation would otherwise trigger such an action according to the general policy 300.

The decision point 30 also monitors the number of times each rule is applied, using data stored in the store of rules 222. This allows verification of classifications—the frequent execution of a rule may indicate a large number of false positives, which can be corrected, for example by increasing the K-value of the KNN algorithm.

If an IP address range is specified, rather than a single IP address, this is likely to signify a business application, using a set of servers, rather than an individual retail client using a single computer terminal. In such a case the threshold flow volume is compared with the aggregate flow volumes of all IP addresses in the range to determine the policy action to take.

Based on these inputs, the policy decision point 30 may determine that a server 14 should be hibernated, and therefore generates an instruction to a process manager 31, which retrieves instructions from a store 311 for effecting the hibernation process 32.

The process manager 31 then runs the hibernation sequence 32. The individual steps of the process will depend on the instructions retrieved from the library 311, which will in turn depend on the nature of the application to be hibernated and the server it is running on. Backup information required to revive the hibernated server, should it later become necessary, is stored in a storage management system 17.

Referring now to FIG. 1, the backup process operates by connecting to the host server 14 which is to be hibernated using its IP address, and copying the application software, configuration files and any stored data to backup storage 170 managed by the storage management system 17.

The server hardware 14 can then be shut down or reallocated to other uses. The application's details are stored in an online catalogue, from which the application may be identified by a user to be restored by retrieval from the storage management system 17 for installation in the virtual management system 18 as a virtualised server. The IP address allocated to the virtualised application will be different from that of the original server-based application, and the user can store this in his browser history and or "favourites", replacing the IP address of the original version. Subsequent invocations of the application can then be routed to the virtual management system 18 without further intervention of the storage management system 17.

The revived IP addresses and port values now associated with the virtual management system 18 can be monitored by the low use monitor 2 in the same way as those of physical servers 13, 14, 15, to identify the usage patterns of restored applications, to determine whether they have subsequently fallen into disuse and should be hibernated again. The criteria for hibernating an application which has already been restored one or more times are preferably set higher than for an initial hibernation. This reduces the likelihood of the application again being hibernated and requiring a yet further restoration, resulting in delay and possible transcription errors which may arise if the virtualisation process is repeated too many. Effectively, the fact that an application has been restored is used as one of the criteria in its profile, determining how it should be classified.

The IP addresses of hibernating applications stored in the storage management system 17 are also monitored by the low use monitor 2 to identify any applications which may be suitable for decommissioning after a period of hibernation without being retrieved, or determining the order in which applications should be deleted when storage is required for newly-virtualised applications. It is preferable that such irrevocable deletion from storage is not made without confirmation from a human intervention.

The invention claimed is:

1. A method of operating a data network comprising a plurality of servers, the servers having respective network addresses associated with respective application functions, comprising the steps of:
   monitoring data flows to and from each individual one of the plurality of servers,
   creating for each server a profile, representing network traffic behavior of the server, based on the monitored data flows,
   classifying servers according to their profiles;
   identifying servers classified as having profiles indicative of low server usage by comparison to at least one centrally stored profile having a characteristic of low server usage;
   retrieving programming instructions and data relating to the identified servers classified as having profiles indicative of low server usage;
   storing the retrieved programme instructions and data in a storage medium from which the stored data relating to each server may subsequently be retrieved to create a corresponding virtual server replicating the server to which it relates by recovering and installing the stored programme instructions and data such that further data requests can be fulfilled by the virtual server
   shutting down the servers classified as having profiles indicative of low server usage and for which data has been stored.

2. A method according to claim 1, wherein each server is classified by comparison with a classification of exemplars from a model database of server data flow patterns.

3. A method according to claim 2, wherein after classification the server characteristics are added to the exemplars in the model database.

4. A method according to claim 1, wherein the shutdown is subject to a criticality override factor.

5. A method according to claim 4, wherein a profile is also created for each virtual server, and a virtual server is shut down if it is classified as having a profile indicative of low server usage.

6. A method according to claim 5, wherein the criteria for classifying a profile of a virtual server as being indicative of low server usage and triggering a shut down of that virtual server are different from the criteria applied to the server from which the data was originally replicated.

7. A non-transitory computer-readable storage medium storing a computer program or suite of computer programs which upon execution by a computer system performs the method of claim 1.

8. The method according to claim 1, wherein the creation of each profile, representing network traffic behavior of the server, includes defining a multi-dimensional vector that represents the network traffic behavior of the server over a specified period of time.

9. The method according to claim 1, wherein the creation of each profile, representing network traffic behavior of the server, includes identifying all flows relating to the server as a server or as a client.

10. The method according to claim 1, wherein the creation of each profile, representing network traffic behavior of the server, includes identifying all of a plurality of ports of the profile used, and count the number of times each port is used.

11. The method according to claim 1, wherein each server is classified by comparison, using a K-Nearest Neighbor algorithm, with classification of exemplars from a model database of server data flow patterns.

12. An apparatus for controlling the operation of a plurality of data servers connected to a data network, the servers having respective network addresses associated with respective application functions, the apparatus comprising:
    a data flow monitor to monitor data traffic to and from each individual one of the plurality of servers,
    a profile creation processor for creating for each server a profile representing network traffic behavior of the server, each profile being created based on the monitored data traffic,
    a server classification system for identifying servers having a profile associated with low usage of the servers by comparison to at least one centrally stored profile having a characteristic of low server usage;
    a server hibernation store comprising data storage for programming instructions and data accessed from servers classified as low-usage servers,
    a server management system for accessing programming instructions and data from servers identified as having low-server-usage profiles for which programming instructions have been stored in the server hibernation store, and for shutting down the operation of such data servers
    a server virtualisation system comprising a programmable server having means for retrieving, from the server hibernation store, programming instructions and data relating to a server and installing the programming instructions and data in a programmable server in order to generate a virtual server replicating the server in respect of which they were originally retrieved.

13. An apparatus according to claim 12, arranged to monitor and classify data flows to the virtual servers, and to shut down virtual servers classified as having profiles indicative of low server usage.

14. The apparatus according to claim 13, wherein the criteria for classifying a profile of the virtual server as being indicative of low server usage and triggering a shut down of that virtual server are different from the criteria applied to the server from which the data was originally replicated.

15. The apparatus according to claim 13, wherein the profile creation processor, to create each profile representing network traffic behavior of the server based on the monitored data traffic, is configured to define a multi-dimensional vector that represents the network traffic behavior of the server over a specified period of time.

16. The apparatus according to claim 13, wherein each server is classified by comparison, using a K-Nearest Neighbor algorithm, with classification of exemplars from a model database of server data flow patterns.

17. The apparatus according to claim 13, wherein the profile creation processor, to create each profile representing network traffic behavior of the server based on the monitored data traffic, is configured to identify all flows relating to the server as a server or as a client.

18. The apparatus according to claim 13, wherein the profile creation processor, to create for each profile representing network traffic behavior of the server based on the monitored data traffic, is configured to identify all of a plurality of ports of the profile used, and count the number of times each port is used.

* * * * *